Figure 1:
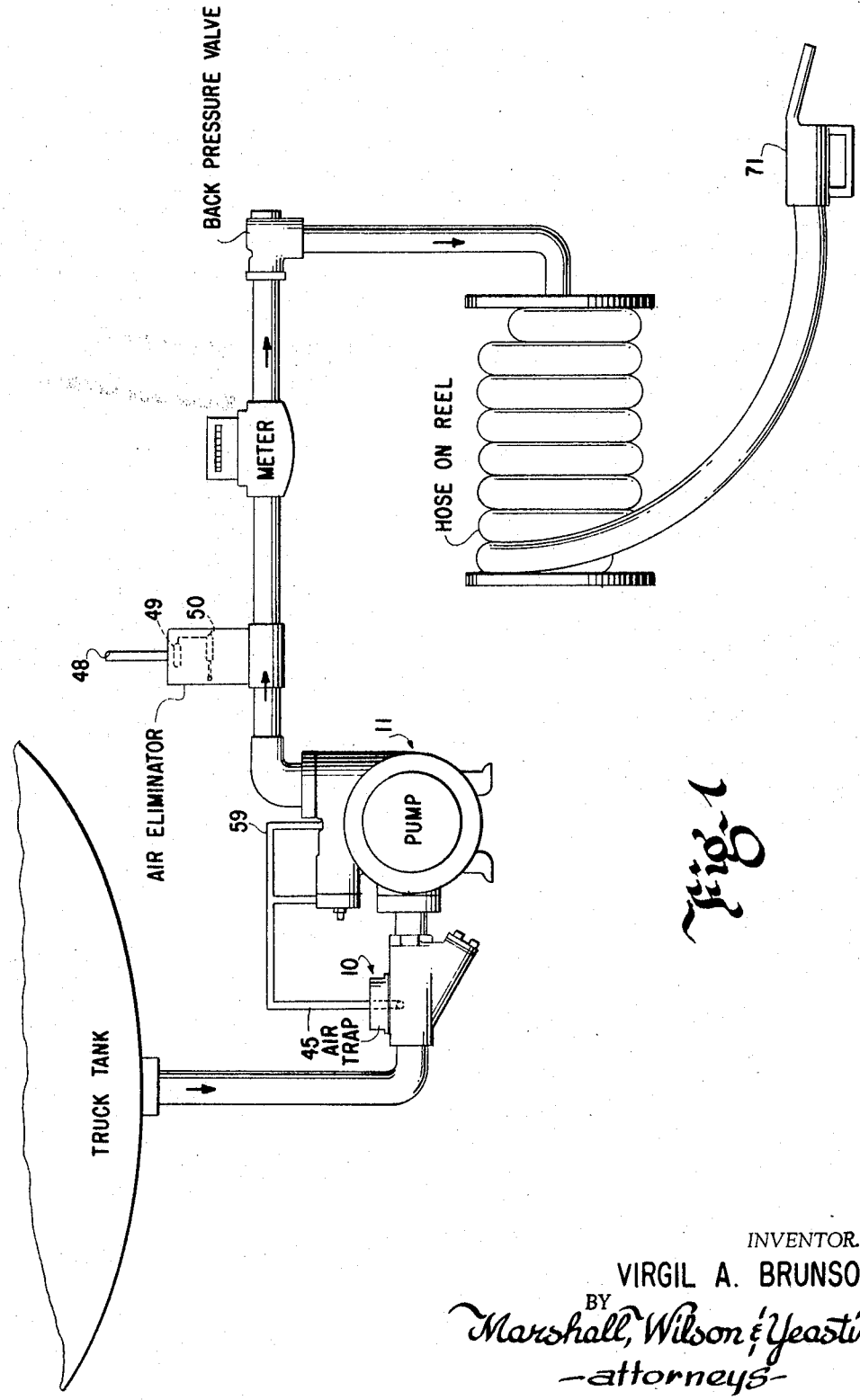

Aug. 16, 1966  V. A. BRUNSON  3,266,425
LIQUID DISCHARGE SYSTEM

Filed May 6, 1964  3 Sheets-Sheet 2

INVENTOR.
VIRGIL A. BRUNSON
BY Marshall, Wilson & Yeasting
-attorneys-

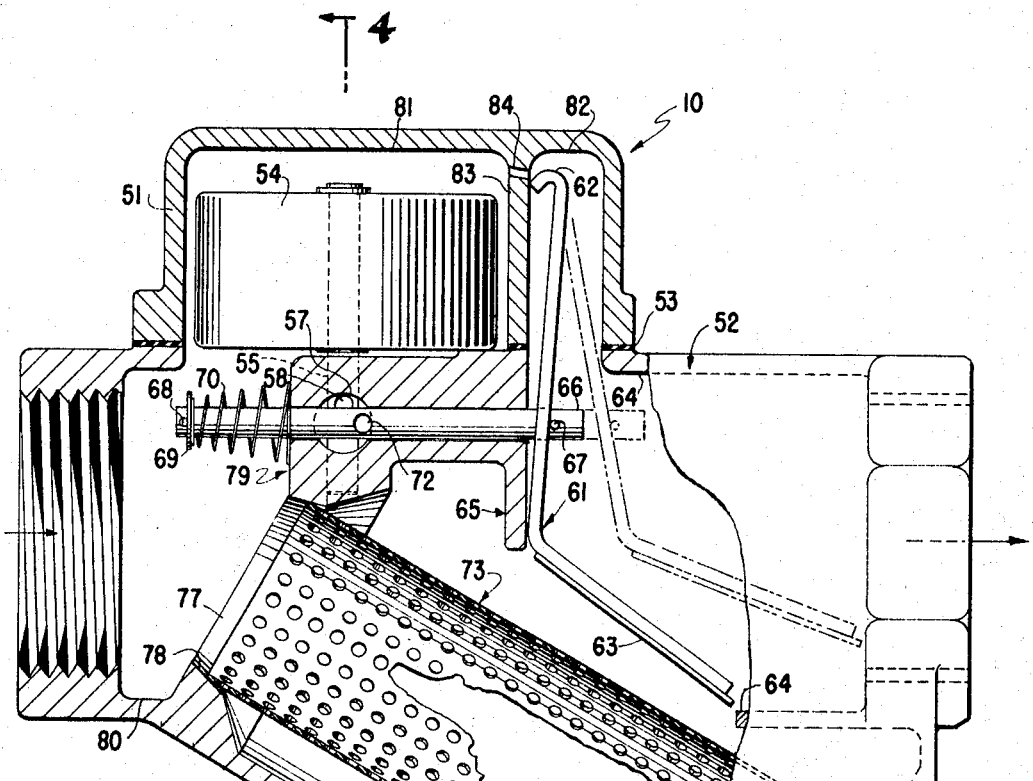
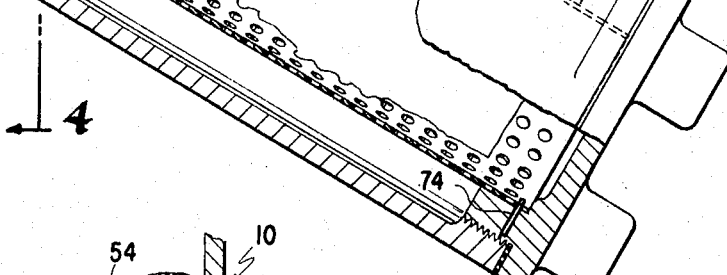
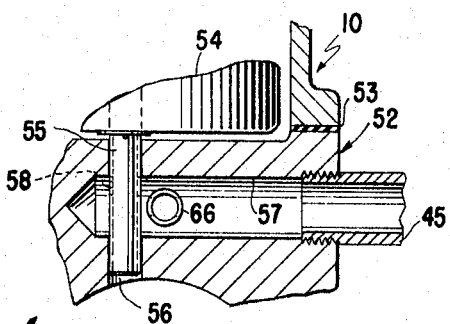

United States Patent Office 3,266,425
Patented August 16, 1966

1

3,266,425
LIQUID DISCHARGE SYSTEM
Virgil A. Brunson, Grand Rapids, Mich., assignor, by mesne assignments, to Dover Corporation, New York, N.Y., a corporation of Delaware
Filed May 6, 1964, Ser. No. 365,267
7 Claims. (Cl. 103—41)

The invention relates to improvements in liquid delivery systems, and particularly systems which are used for pumping liquids from tank trucks such as fuel oil delivery trucks.

The pumping system of a fuel oil delivery truck includes a meter for measuring the quantity of fuel that is pumped from the truck to the customer's storage tank. Also it is conventional to include in such a system, ahead of the meter, an air eliminator for separating air from the liquid and discharging the air to the atmosphere. In addition, such a system ordinarily includes a back pressure valve which is located at a point following the meter, and which maintains pressure in the air eliminator and the meter.

The purpose of including a back pressure valve in such systems has been to improve the efficiency of the air eliminator by maintaining pressure on the system and thus forcing the air out of the system through the air eliminator. Another beneficial effect of the minimum pressure maintained by the back pressure valve is that any air bubbles that do pass through the meter are compressed to a smaller volume so as to cause the meter to give a truer indication of the volume of liquid flowing through the meter.

The pumping system in a fuel oil delivery truck is subjected to periodic tests by weights and measures officials to determine whether or not the meter in the system gives a correct indication of the volume of fuel oil delivered. One of the tests that is used is a test to determine whether or not the meter will give a false indication in the event that a tank on the truck runs dry while fuel oil is being pumped from the tank. This is a common occurrence, because a tank truck usually has at least two separate tanks or compartments. Often a tank will run dry while a customer's storage tank is being filled. The operator then continues pumping until the tank has been drained. Then he returns to the truck and changes the valves to connect the pumping system to a full tank.

Whenever a tank on a truck runs dry while liquid is being pumped from the tank, the pump begins to pass air but the air eliminator is supposed to discharge the air to the atmosphere and thus prevent air from passing through the meter. However, the pumping systems of tank trucks are operated at high delivery rates in order to save time, and it has been found that when a tank runs dry while the pumping system is operating at a high delivery rate, the air eliminator often is unable to handle the relatively large volume of air that passes through the pump so that some of the air passes through the meter, producing a false reading of the amount of fuel delivered.

The principal object of the invention is to provide a novel liquid delivery system including a novel type of control that prevents large volumes of air from being drawn through the system. More specific objects and advantages are apparent from the following description, in which reference is had to the accompanying drawings illustrating a preferred embodiment of the invention.

Figure 2:
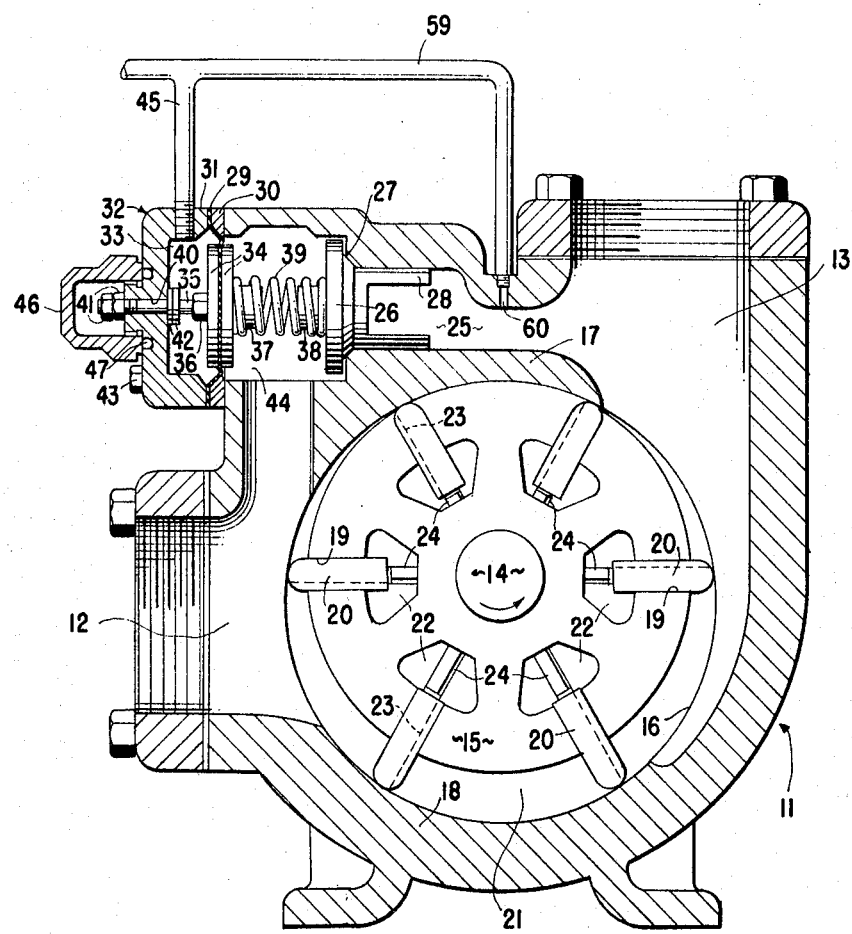

In the drawings:
FIG. 1 is a diagrammatic view of a liquid delivery system embodying the present invention;
FIG. 2 is a vertical section of a pump which may be used in the liquid delivery system of FIG. 1;
FIG. 3 is a vertical section of a pilot valve control embodying the present invention which may be used in the liquid delivery system of FIG. 1;

2

FIG. 4 is a fragmentary vertical section taken on the line 4—4 of FIG. 3.

These specific drawings and the specific description that follows merely disclose and illustrate and are not intended to limit the invention.

In the specific embodiment shown in FIG. 1, an air trap 10 is located ahead of the pump 11. This embodiment also includes an air eliminator, a meter and a back pressure valve in the customary order following the pump.

As shown in more detail in FIG. 2, the pump 11 is a positive displacement pump of the rotary sliding vane type having an inlet port 12 and an outlet port 13. A shaft 14, extending transversely through the pump, carries a cylindrical rotor 15 which is eccentrically located in a rotor chamber 16.

An interior partition 17 which fits closely against the top of the rotor 15 forms the upper side of the rotor chamber 16, and the lower portion 18 of the pump housing forms the lower side of the rotor chamber.

The rotor 15 has a plurality of radial slots 19 extending parallel to the shaft 14 in which are located sliding vanes 20 that cooperate with the exterior surface of the rotor 15 and the lower portion 18 of the pump housing to provide a series of pockets 21 in which fluid is transported from the inlet port 12 toward the outlet port 13 of the pump.

At the base of each slot 19 is a chamber 22 extending axially through the rotor 15. A radial groove 23 is provided in the forward face of each vane 20 to afford free communication from each chamber 22 to the exterior of the rotor 15. The grooves 23 prevent the occurrence in the chambers 22 of a vapor or liquid lock which would interfere with free movement of the vanes 20. Also, while each vane is in its lowermost or active position, the pressure built up in the pocket 21 ahead of the vane is communicated to the chamber 22 behind the vane and tends to hold the vane against the lower portion 18 of the pump housing.

Each vane 20 is connected to the diametrically opposite vane by a push rod 24 extending through the rotor 15, so that as each vane is pushed inward by contact with the wall of the rotor chamber 16, the diametrically opposite vane is pushed outward to keep it in contact with the wall of the chamber.

A bypass duct 25 leading from the outlet port 13 past a disk valve 26 to the inlet port 12 is provided. The valve 26, which controls the flow through the duct 25, is shown as a disk valve, although other types such as piston valves, ball seat valves or angular seat valves may be employed as long as the outlet pressure of the pump tends to open the valve. The disk valve 26 seats at 27 and is carried on a valve guide 28 that is axially slidable in the bypass duct 25.

A flexible diaphragm 29, which, like a piston, is a pressure responsive member, is clamped between a marginal face of a ring 30 and a rim 31 of a cap or cup 32 enclosing a diaphragm chamber 33. The central portion of the diaphragm 29 is clamped between a pair of disks 34 mounted on a stem 35. A nut 36 on the stem 35 engaging the left hand disk 34 as viewed in FIG. 2 holds the right hand disk 34 against a spring mounting 37 carried by the right hand end of the stem 35. A second spring mounting 38 is carried by the valve disk 26, and the ends of a regulator coil spring 39 receive the mountings 37 and 38, the regulator spring 39 being compressed between the respective diaphragm disk 34 and the valve disk 26, urging the valve toward its seat 27, i.e., toward its closed position.

The diaphragm stem 35 is axially slidable in an opening 40 in the cup 32. Adjustment nuts 41 on the left hand end of the stem 35 exterior of the cup 32 act as a stop limiting movement of the stem 35 to the right by engaging the cup 32. Washers 42 act as a stop limiting movement of the stem 35 to the left by engaging the nut 36. The ring 30 and the cup 32 are held in place by means of screws 43, only one of which is shown, at an opening 44 which is closed by the diaphragm 29, is in communication with the passage 25 and is between the valve 26 and the inlet port 12.

The valve 26 is a liquid pressure adjusted relief valve, its body being made up of the ring 30, the cup 32 and that part of the pump housing at the valve 26, the valve seating at 27 in the pump. The diaphragm 29 is movable under the influence of liquid under pressure (liquid supplied to the chamber 33 through tubing 45) to a position determined by engagement of the stop, i.e., adjustment nuts 41, with the valve body, to compress the regulator spring 39 for high pressure valve operation, and is returned by the regulator spring in the absence of the liquid pressure to permit low pressure valve operation. The stop 41 is adjustable to select the desired high pressure. The number or the thickness of the washers 42 is varied to select the desired low pressure. The stop 41 is covered by a hollow nut 46 threaded on the cup 32, there being a rubber O-ring 47 between the hollow nut 46 and the cup 32 to prevent leakage.

The pressure of the fluid in the outlet port 13 acts against the right side of the valve disk 26 and this force is opposed by the force of the regulator spring 39. Control means, hereinafter described, are provided which communicate with the chamber 33 through the tubing 45 and are responsive to the flow in the discharge system, for supplying liquid under pressure to the chamber 33 to drive the diaphragm toward the valve seat 27 compressing the regulator spring 39 between the diaphragm disk 34 and the valve disk 26 when normal liquid flow exists in the discharge system, and to exhaust or dump liquid from the chamber 33 permitting the regulator spring 39 to expand and push the diaphragm 29 away from the valve seat 27 when air begins to pass through the discharge system. The regulator spring 39 in its compressed condition maintains a high regulated pressure in the outlet port 13 and in its expanded condition maintains a low regulated pressure in the outlet port 13.

As shown in FIG. 1, the air eliminator that follows the pump 11 is provided with an air vent 48 controlled by a valve 49 that is operated by a float 50. As liquid is pumped through the lower portion of the air eliminator, bubbles of air tend to rise so that air accumulates in the upper portion of the air eliminator and the liquid level falls, causing the float 50 to fall. As the float 50 begins to fall, however, it opens the valve 49, permitting air to escape through the vent 48.

Under normal operating conditions, the liquid level in the air eliminator remains substantially constant, and the valve 49 operates to prevent additional air from accumulating in the air eliminator. However, if the tank runs dry while the pump 11 is being operated at a high rate, the pump tends to pass a large volume of air, usually in the form of a foam, so that the air eliminator would not be able to eliminate all of the air and much of the air would pass through the meter, giving a false reading. This undesirable result is prevented by a novel air trap control which is embodied in the present liquid delivery system.

In the operation of the present liquid delivery system, whenever a tank runs dry while the pump is operating at a high rate, the air trap control senses accumulation of air in the air trap and reduces the closing bias of the relief valve on the pump. The reduced closing bias of the relief valve then permits the relief valve to open far enough to bypass part of the liquid from the outlet side back to the inlet side of the pump. In this manner, when the tank begins to run dry, the rate of delivery from the pump is immediately reduced, so that the volume of air then delivered by the pump is small enough to be within the normal capacity of the air eliminator.

The air trap control used in the practice of the invention may consist of any bias control system, for determining the closing bias of the relief valve on the pump, which includes a device actuated, by sensing accumulation of air in an air trap in series with the pump, to reduce the closing bias of the relief valve. Preferably the bias control system is a pressure control system including a chamber having an expansible wall for biasing the relief valve. Although the fluid used in the control system may be air, the simplest system is one in which the fluid is the liquid delivered by the pump, the pressure for the control system being supplied by the pump itself as in the system illustrated in the present drawings.

The preferred air trap control for use in the practice of the invention includes a float which operates to reduce the closing bias of the relief valve in the pump whenever air begins to accumulate in the air trap so as to cause the liquid level in the air trap to fall.

The air trap which is used in the practice of the present invention for controlling the delivery rate of the pump preferably is located ahead of the pump. One advantage of such location of the air trap is that when the tank begins to run dry, air starts to accumulate in the air trap even before the air reaches the pump.

Another important advantage of locating the air trap ahead of the pump is that a given amount of air at this point occupies a much greater volume than the same amount of air would occupy at the higher pressure existing on the discharge side of the pump. The greater volume occupied by a given amount of air at this point facilitates the sensing of the accumulation of air in the air trap.

A further advantage of locating the air trap on the low pressure side of the pump is that low pressure may be attained in the diaphragm chamber 33 by merely connecting the pipe 45 to the interior of the air trap, for example by means of a float operated valve.

A preferred form of air trap is shown in FIG. 3, the air trap itself being contained in a cap 51 secured by screws (not shown) on top of a casing 52. A gasket 53 is interposed between the cap 51 and the casing 52 to provide a sealed joint.

The cap 51 contains a float 54, which may consist of a sealed metal container or may consist of a block of plastic foam. The float 54 is mounted on a central sleeve 55 which is slidable in a vertical bore 56 that extends through a portion of the casing 52. Intersecting the vertical bore 56 and extending to the exterior of the casing 52 is a horizontal bore 57. A hole 58 in the side of the sleeve 55 serves as a valve port between the bore 57 and the interior of the sleeve 55, which is open when the float is in its lowermost position and is closed when the float is in a raised position.

The bore 57 is connected by means of the pipe 45 to the diaphragm chamber 33, and a branch pipe 59 leads from the pipe 45 to an orifice 60 which communicates with the bypass duct 25.

When the pump 11 is placed in operation, liquid flows from the high pressure side of the pump through the orifice 60, the branch pipe 59 and the pipe 45 to the diaphragm chamber 33. Flow of oil into the diaphragm chamber 33 causes the diaphragm 29 to be distended until the nuts 41 on the stem 35 strike against the cup 32.

The bypass valve 26 serves as a relief valve to limit the pressure which can be obtained on the discharge side of the pump. However, when the diaphragm 29 is distended by liquid under pressure in the diaphragm chamber 33, the pressure maintained on the discharge side of the pump may be of the order of 50 pounds greater than the pressure that is maintained when the diaphragm 29 is in its relaxed position.

Because of the relatively small size of the orifice 60, the distention of the diaphragm 29 by liquid admitted through the orifice 60 always takes place gradually rather than suddenly. Thus the increase in pressure on the discharge side of the pump caused by distention of the diaphragm 29 and compression of the regulator spring 39 is always gradual rather than sudden, so as not to cause sudden stiffening of a delivery hose which is being handled by the operator.

In the operation of the specific air trap control shown in the drawings, accumulation of air in the air trap 10 reduces the liquid level, thus permitting the float 54 to fall to the position shown in FIG. 3, bringing the hole 58 in the sleeve 55 into communication with the bore 57. Liquid then flows from the pipe 45 through the hole 58 to the interior of the sleeve 55 and thence downward through the vertical bore 56 to the interior of the casing 52. The pressure in the diaphragm chamber 33, which had been kept relatively high by liquid bleeding from the discharge side of the pump through the orifice 60, then falls to a relatively low value by reason of the "dumping" of liquid from the diaphragm chamber 33 through the hole 58 to the interior of the casing 52, which is on the low pressure side of the pump. The resulting reduction in the pressure in the diaphragm chamber 33 permits the diaphragm 29 to move from its expanded position to its relaxed position, thus causing the rate of delivery from the pump to be reduced.

The orifice 60 should be substantially more restricted than the hole 58 in the sleeve 55, so that when the float 54 falls to the position shown in FIG. 3 liquid will flow rapidly from the diaphragm chamber 33 to permit the diaphragm 29 to move quickly to its relaxed position.

The casing 52 also preferably contains a member for sensing flow of liquid induced by the pump. In the specific embodiment shown in FIG. 3, this member consists of a vane 61 having a hooked upper end 62 and having a plate 63 secured to its lower end. When the vane 61 is in the position shown in solid lines in FIG. 3, flow of liquid to the outlet port 64 of the casing 52 is blocked by the plate 63 acting in conjunction with a depending baffle 65.

A horizontal sleeve 66, which is slidably held in a bore drilled through a portion of the casing 52, extends through a loosely fitting hole in the vane 61, and a pin 67 fixed in the sleeve 66 restrains the vane 61 against movement away from the depending baffle 65. A second pin 68 fixed in the opposite end of the sleeve 66 retains a washer 69 by means of which a spring 70 is held under compression.

When liquid is flowing through the casing 52 at the normal rate, the flow of liquid holds the vane 61 in the position shown in dotted lines, the spring 70 being compressed. However, if the operator shuts off the manually controlled valve 71 at the end of the hose, or nearly closes the valve 71 to "top off" the customer's storage tank when it is nearly filled, the vane 61 moves to the position in which it is shown in full lines in FIG. 3. Movement of the vane to this position exposes a hole 72 in the sleeve 66 which is similar to the hole 58 in the sleeve 55. When the hole 72 is thus exposed, it places the bore 57 in communication with the interior of the sleeve 66, which in turn communicates with the interior of the casing 52.

Movement of the hole 72 into the position shown in FIG. 3 has exactly the same effect as movement of the hole 58 into the position shown in FIG. 3, in that it permits liquid to flow from the diaphragm chamber 33 so as to cause the diaphragm 29 to move to its relaxed position.

Thus whenever the operator closes or nearly closes the manually operated valve 71 at the end of the hose, movement of the vane 61 to the position shown in solid lines in FIG. 3 causes the pressure on the discharge side of the pump to be reduced from its normal value of about 100 pounds per square inch to a lower value which may be from 35 to 50 pounds per square inch. At such lower pressure the velocity of the liquid flowing through a nearly-closed valve 71 is lower so as to cause less foaming during "topping off."

Also at such lower pressure, when the operator finishes the filling operation and closes the valve 71, the hose is not too stiff to be rewound on the reel. On the other hand, the pressure is still enough at the lower value so that the hose remains distended when it is rewound on the reel. If the hose were not kept distended while being rewound on the reel, the inner turns of the hose would tend to flatten out, and thereafter it would be difficult to pump liquid through the hose without unwinding the hose completely from the reel.

Thus the specific assembly shown in FIG. 3 has the advantage that it provides a valuable auxiliary control inexpensively by the mere addition of the vane 61, the sleeve 66 and the spring 70.

With this arrangement, the system has three possible operating conditions. The first of these operating conditions is the normal pumping condition in which the manually controlled valve 71 is open, the float 54 is in a raised position, the vane 61 is in its dotted line position, the diaphragm 29 is in its distended position and the pump is delivering its full capacity of 80 to 100 gallons per minute.

In the second possible operating condition, the manually controlled valve 71 is closed or nearly closed, the float 54 is in a raised position, the vane 61 is in its full line position, the diaphragm 29 is in its relaxed position and the relief valve 26 is open wide enough to recirculate all or nearly of the liquid pumped by the rotor 15.

The third possible operating condition is a novel operating condition in which the tank is being drained and the pump is sucking air, the float 54 is in a lowered position, the diaphragm 29 is in its relaxed position and the delivery rate of the pump is not more than about 50 to 60 gallons per minute because of the bypassing action of the relief valve 26. In the latter operating condition, the amount of air passed by the pump is within the normal capacity of the air eliminator so that substantially no air passes through the meter.

In liquid delivery systems a strainer is commonly used on the intake side of the pump. The casing 52 provides a convenient location for a strainer, which may consist of a perforated cylinder 73. The perforated cylinder 73 may be secured by means of a pin 74 in a plug 75 which is threaded into the lower portion of the casing 52, a gasket 76 being employed to prevent liquid from leaking past the plug 75. When the plug 75 is seated, a beveled surface on the end of the perforated cylinder 73 fits tightly into a tapered seat 78 in a partition 79 that extends across the inlet port 80 of the casing 52. This arrangement is such that all the liquid flowing through the casing 52 must pass through the perforated cylinder 73. The perforated cylinder 73 may be readily removed for cleaning by unscrewing the plug 75.

An important advantage of locating the strainer in the casing 52 is that it provides a slight pressure drop between the inlet side and the outlet side of the casing. In order to take advantage of this slight pressure drop, the cap 51 is divided into two chambers which are sealed from one another by means of the gasket 53. One of these two chambers is a float chamber 81 which is in communication with the inlet port 80, and the other of the two chambers is a smaller chamber 82 which is in communication with the outlet port 64. The width of the chamber 82, measured in a direction parallel to the bore 57, is only slightly greater than the width of the vane 61.

The chambers 81 and 82 are separated by a partition 83, in which there is a restricted orifice 84, located near the top of the float chamber 81. The pressure drop between the inlet side and the outlet side of the casing 52, which is caused by the presence of the strainer, is applied across the partition 83, so that any air which accumulates in the float chamber 81 will bleed slowly through the orifice 84 into the smaller chamber 82. Thus the float 54 will remain in its elevated position unless the rate at which air accumulates in the float chamber 81 is greater than the rate at which air bleeds through the orifice. In other words, the float 54 will remain in its raised position so long as the amount of air entering the inlet port 80 with the liquid is small enough to be handled safely by the air eliminator, and the float 54 will fall when air enters the inlet port 80 in an excessive amount which is beyond the normal capacity of the air eliminator.

Also, after the float 54 has fallen to its lowermost position, the bleeding of air through the orifice 84 will permit the float 54 to rise as soon as an excessive amount of air is no longer present in the liquid entering the inlet port 80. Then with the float 54 in its raised position, the hole 58 in the sleeve 55 no longer will be in communication with the bore 57 and the pipe 45, so that the pump 11 again will discharge liquid at its normal high rate, provided that the manually controlled valve 71 is open so that the flow of liquid is sufficient to hold the vane 61 in its dotted line position.

As shown in FIG. 3, the design of the casing 52 is such that the air bubbles tend to rise into the float chamber 81, while the liquid entering the inlet port 80 flows downward into the perforated cylinder 73.

An ordinary spring-loaded poppet valve may be used as the back pressure valve following the meter. A preferred form of back pressure valve is disclosed in application Serial No. 351,946 filed March 16, 1964, now Patent No. 3,197,069.

The embodiment of the invention which has been described may be modified to meet various requirements.

Having described the invention, I claim:

1. A liquid delivery system comprising, in combination, a positive displacement pump having a control for reducing the capacity of the pump, a meter connected in series with the pump on the downstream side, an air eliminator connected between the pump and the meter, an air trap which is connected in series with the pump and which is upstream from the air eliminator, and a device which is actuated by accumulation of air in the trap when air is being passed by the pump at a rate rate greater than can be handled by the air eliminator and which, when actuated, operates the pump control to reduce the capacity of the pump to a value such that the air eliminator is able to take out air passed by the pump and thus allow the meter to read true.

2. A liquid delivery system as claimed in claim 1 wherein the air trap is located on the inlet side of the pump and contains a float, and the device which operates the pump control to reduce the capacity of the pump is actuated by the float when the liquid level falls in the air trap.

3. A liquid delivery system as claimed in claim 2 which comprises a strainer interposed between the air trap and the pump, and a restricted passage leading from the upper portion of the air trap to the inlet side of the pump which bypasses the strainer, for bleeding air from the air trap after accumulation of air has stopped.

4. A liquid delivery system as claimed in claim 1 wherein the pump control comprises a relief valve which opens automatically at a preset pressure for bypassing liquid from the outlet to the inlet side of the pump, apparatus for biasing the relief valve toward closed position with a controlled force, and a bias control which is actuated by accumulation of air in the trap and which when actuated, operates to reduce the biasing force applied to the relief valve by such apparatus in order to reduce the capacity of the pump.

5. A liquid delivery system as claimed in claim 4 wherein the apparatus for biasing the relief valve toward closed position includes a pressure chamber having an expansible wall, and the bias control operates to reduce the biasing force by changing the pressure in the chamber.

6. A liquid delivery system as claimed in claim 5 wherein the air trap contains a float, and the bias control which operates to reduce the biasing force by changing the pressure in the chamber is a pilot valve which is actuated by the float when the liquid level falls in the air trap.

7. A liquid delivery system as claimed in claim 5 wherein the air trap contains a float, and the bias control which operates to reduce the biasing force by changing the pressure in the chamber includes a member for sensing flow of liquid induced by the pump and a pilot valve assembly which is operatively connected to the float and to the flow-sensing member and is actuated to reduce the biasing force by changing the pressure in the chamber both upon reduction of the liquid level in the air trap and upon reduction of the flow of liquid induced by the pump.

References Cited by the Examiner

UNITED STATES PATENTS

| | | | |
|---|---|---|---|
| 1,824,465 | 9/1931 | Carter | 103—113 |
| 2,625,108 | 1/1953 | Logan | 103—42 |
| 2,693,196 | 11/1954 | Hundley | 103—41 |
| 2,897,764 | 8/1959 | Tracy | 103—113 |
| 3,021,790 | 2/1962 | Brunson | 103—136 |

MARK NEWMAN, *Primary Examiner.*

W. J. KRAUSS, *Assistant Examiner.*